(12) United States Patent
Peus et al.

(10) Patent No.: US 11,097,249 B2
(45) Date of Patent: *Aug. 24, 2021

(54) METHOD AND DEVICE FOR TREATING SOLID-FLUID MIXTURES

(75) Inventors: Dominik Peus, Guilford (GB); Stephan Lubbe, Felde (DE)

(73) Assignee: ANTACOR, LTD., Mosta (MT)

( * ) Notice: Subject to any disclaimer, the term of this patent is extended or adjusted under 35 U.S.C. 154(b) by 23 days.

This patent is subject to a terminal disclaimer.

(21) Appl. No.: 13/636,972

(22) PCT Filed: Mar. 24, 2011

(86) PCT No.: PCT/IB2011/051246
§ 371 (c)(1),
(2), (4) Date: Sep. 24, 2012

(87) PCT Pub. No.: WO2011/117837
PCT Pub. Date: Sep. 29, 2011

(65) Prior Publication Data
US 2013/0011327 A1 Jan. 10, 2013

(30) Foreign Application Priority Data
Mar. 24, 2010 (DE) .................... 10 2010 012 613.6

(51) Int. Cl.
C10L 9/08 (2006.01)
B01J 19/24 (2006.01)
C10L 5/44 (2006.01)
B01J 8/00 (2006.01)

(52) U.S. Cl.
CPC .......... *B01J 19/243* (2013.01); *B01J 8/0045* (2013.01); *B01J 19/245* (2013.01); *C10L 5/44* (2013.01);
(Continued)

(58) Field of Classification Search
CPC ....... B01J 19/2435; B01J 19/244; C10L 5/44; C10L 5/442; C10L 5/445; C10L 5/447
See application file for complete search history.

(56) References Cited

U.S. PATENT DOCUMENTS 4,425,256 A * 1/1984 Pilipski .................... 502/418
5,354,345 A * 10/1994 Nehls, Jr. ................. 44/626
(Continued)

FOREIGN PATENT DOCUMENTS

DE 102007012112 B3 * 5/2008
DE 102007012112 B3 5/2008
(Continued)

OTHER PUBLICATIONS

English—Machine Translation of DE 102008058444 A1 provided by WIPO.*
(Continued)

*Primary Examiner* — Jonathan Luke Pilcher
(74) *Attorney, Agent, or Firm* — Damian Wasserbauer, Esq.; Wasserbauer Law LLC

(57) ABSTRACT

A laminar stream reactor for the production of hydrochar of a solid-fluid mixture of water and a carbon-containing component, wherein the solid-fluid mixture is treated at a temperature of 100-300° C. and a pressure of 5-70 bar, consists of tubular reactor units of largely vertical holding sections (1,3) and direction-changing diverters (2,4). The holding sections are thereby flown through slower by the solid-fluid mixture than the remaining tube distances, as they have larger diameters.

18 Claims, 3 Drawing Sheets

(52) U.S. Cl.
CPC ..... *C10L 9/086* (2013.01); *B01J 2219/00006* (2013.01); *B01J 2219/00252* (2013.01); *Y02E 50/10* (2013.01); *Y02E 50/30* (2013.01)

(56) References Cited

U.S. PATENT DOCUMENTS

| 8,746,963 | B2 * | 6/2014 | Ni et al. | 366/182.2 |
| 2004/0076578 | A1 * | 4/2004 | Winter | 423/610 |
| 2010/0162619 | A1 * | 7/2010 | Peus | 44/605 |
| 2011/0226603 | A1 * | 9/2011 | Peus | 201/10 |

FOREIGN PATENT DOCUMENTS

| DE | 102008058444 | | 5/2009 |
| DE | 102008058444 | A1 * | 5/2009 |
| DE | 102008007791 | | 8/2009 |
| DE | 102008007791 | A1 * | 8/2009 |
| WO | WO 2008/095589 | | 8/2008 |
| WO | WO 2008095589 | A1 * | 8/2008 |
| WO | WO 2008113309 | A1 * | 9/2008 |
| WO | WO 2009090072 | A1 * | 7/2009 |
| WO | WO 2009095015 | A1 * | 8/2009 |

OTHER PUBLICATIONS

English Abstract—Machine Translation of DE 102007012112 B3 provided by WIPO.*
English Abstract—Machine Translation of DE 102008007791 A1 provided by WIPO.*
Titirici et al., New J. Chem. (2007), pp. 787-789).

* cited by examiner

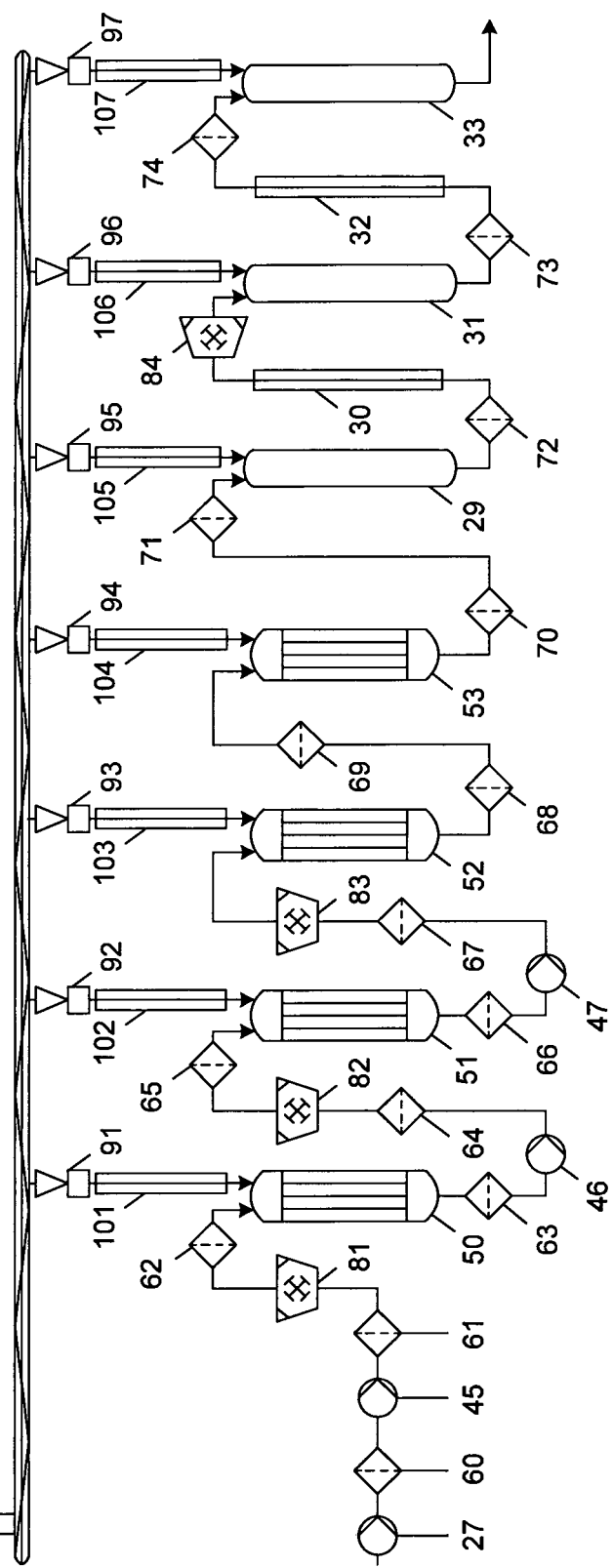
Fig. 3
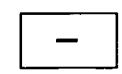
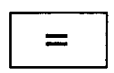

METHOD AND DEVICE FOR TREATING SOLID-FLUID MIXTURES

TECHNICAL AREA

Hydrothermal carbonization (HTC), a chemical method for the simple and highly efficient production of hydrochar which is also termed hydrochar, biocoal or green coal which is similar to black or brown coal, humus or peat, was described for the first time in detail in 1913 by the German Nobel laureate Friedrich Bergius. This HTC process imitates the natural coalification process (that is, the natural process of the conversion of dead plant material and biomasses to humic acid and peat, then to brown coal and finally to black coal) within a few hours. Systematic experiments were carried out by E. Berl et al. (Ann. Chem. 493 (1932), pp. 97-123; Angew. Chemie 45 (1932), pp. 517-519) and by J. P. Schumacher et al. (Fuel, 39 (1960), pp. 223-234) and more recently by Professor Markus Antonietti of the Max-Planck-Institute of Colloids and Interfaces in Potsdam near Berlin.

Biomass is heated together with water to about 180° C. and 15-20 bars of pressure. Within in a few hours this is turned into a hydrochar containing suspension. The different phases of the chemical reaction are chronologically divided into a heating phase, depolymerization phase, restructuring phase and stabilization phase. The chemical conversion reaction is exothermic releasing up to 34 percent of the energy contained in the feedstocks and in particular in saccharides containing material. The carbon suspension has, after the reaction, compared to the feedstocks or starting substances, advantageous properties due to molecular and structural chemical changes, which enables a fast and simple dewatering, drying and if necessary also subsequent comminution with minimal energy expenditure. During the reaction hydrogen and oxygen are released as water which is a prominent by-product of this process. Compared to the starting material the relative molecular content of carbon (C) is increased and the content of oxygen (O), sulfur (S), potassium (K) and chlorine (Cl) as well as ash in decreased. Compared to feedstock hydrochar possesses a higher fuel value. It can be used as fuel and other uses are currently discussed such as soil improvement.

Biomass is the most important carbon converter with the highest efficiency to capture $CO_2$ from the atmosphere. Therefore, only biomass can form the basis for the formation of energy systems which indeed reduce carbon and which are capable to remove our emissions from the past. For the formation of such a carbon sink, the carbon has to be bound by a method with a sufficiently high carbon efficiency. Carbon efficiency represents an important indicator of the efficiency of any biomass conversion process as it indicates the percentage of the carbon contained in the feedstock, which remains bound in the end product or fuel. The carbon efficiency of the HTC of up to 90% compares favourably to other biomass conversion processes such as biogas production by fermentation (~50%), wood gasification (~30%) and composting (~10%).

As a result of a comparative analysis of different biomass conversion methods it was found that HTC has the potential to reduce the global release of $CO_2$ considerably in the future (Peter Brandt, J. Verbr. Lebensm. (2009), pp. 151-154): 11% of the biomass of our ecosystem grows on accessible arable land. Depending on the plant, up to 90% of the agricultural biomass cannot be processed as food and are viewed as harvest residues and biogenic waste. The removal of 8.5% of the produced biomass from the active ecosystem would compensate for the entire $CO_2$ released by the combustion of crude oil (Titirici et al., New J. Chem. (2007), pp. 787-789).

In addition to the environmentally friendly minimal $CO_2$ release, the feedstock flexibility will be decisive for the efficiency and the sustainability of any biomass conversion process. HTC is the only biomass conversion method known to date with a high carbon efficiency in which all kinds of feedstocks can be used.

STATE OF THE ART

In WO 2008/095589 A1, DE102007012112B3, WO2008/113309, DE102008004732, DE102008006772, DE102008007791A1 reactors for the treatment of solid-fluid mixtures were suggested and in particular of biomass suspensions, among them also a screw reactor or a simple tubular reactor. However, in practice, the superiority or functionality of the known reactors could not yet be demonstrated.

Reactions of solid-fluid mixtures and in particular of biomasses with a reaction time of more than 20 minutes are unusual and rarely seen in the chemical process technology. Correspondingly, suitable reactors have not yet been developed until now, which would enable a continuous process of the chemical reaction.

DESCRIPTION OF THE INVENTION

It is the object of the invention to find a solution for the economic and continuous conversion of solid-fluid mixtures and to thereby prevent caking and blockages.

The object is solved according to the invention in that the diameter of a lower tube part of the laminar stream reactor is smaller than the one of a descending tube section and that at least the descending tube sections are essentially vertical or are at least inclined to the horizontal.

This specification refers to the contents including definitions, condition and characteristics of WO/2010/058377, EP2106435 and the publication by Libra et al. (Biofuels, 2011, pp. 71-106, 36) whereby the one with the earlier publication date takes priority.

Hydrochar is a fuel or humus/material for soil improvement generated from carbon containing materials or feedstocks by the HTC process. Feedstocks are all plant components and mainly harvest residues, wood, wood residues, roots, leaves, lop, bio waste, biogenic fraction of the residue waste or of industrial waste, animal bodies, slaughter waste, food residues, paper, textiles, excrements or manure, sludge, and other carbon-containing or carbohydrate, cellulose, semi-cellulose and lignine containing materials.

During the reaction hydrogen and oxygen are released as water which is a prominent by-product of the HTC-process. Compared to the starting material the relative molecular content of carbon (C) is increased and the content of oxygen (O), sulfur (S), potassium (K) and chlorine (Cl) as well as ash in decreased. The O/C-ratio decreases about 0.1, 0.2, or 0.3 and the H/C-ratio decreases 0.1-0.2, 0.2-0.4 or about 0.2-0.6 depending on feedstock and reaction conditions. Examples: Before treatment wood has an O/C-ratio of 0.6 and after treatment of about 0.3.

The O/C-ratio of spent grain is reduced from 0.5 to 0.25. The H/C-ratio decreases from 1.4 to 0.9. Compared to feedstock hydrochar possesses a higher fuel value. It can be used as fuel and other uses are currently discussed such as soil improvement.

The reactor units of the laminar stream reactor can be connected to each other in such a manner that they can largely get by without the use of movable components including valves or mechanical agitating devices.

A laminar stream reactor in the sense of the present application is a pressure vessel formed in a tubular manner, which enables the passage of a solid-fluid mixture with flow rates of above 40, 60, 90 or 120 minutes by means of its construction and simultaneously ensures minimal turbulences. The total residence time in the pressurized heat exchangers and reactor is more than 2, 3, or 4 hours and up to 4, 8 or 12 hours. For special applications to yield higher qualities or specific products of hydrochar the residence time can be up to 16, 24 or 30 hours. The temperature at which the treatment takes place in the pressurized heat exchangers and reactor is 100-330° C., 160-250° C., or 180-230° C. at pressures above the fluid/water vapor pressure of 5-20, or up to 45 or 70 bar. The reactor is sealed from the outside air and oxygen.

The laminar stream reactor consists in embodiments of at least two reactor units connected to each other, which respectively consist of several tube sections, tube parts, tube pieces, wherein at least one diverter or direction-changing tube part has a smaller volume or at least a smaller cross section than the holding section (tube parts without directional change).

Certain embodiments are designed according to the following specifications:

The diameter of a diverter is at least 5-500 or 20-100 mm.

The diameter of at least one of the holding sections is at least 1%, 10% or 100% larger than the one of the diverter of the same reactor unit. One reactor unit comprises at least one holding section. The holding section is defined by a larger diameter resulting in a slower flow velocity compared to the diverters. The diameter of the descender is in particular 25%, 50% or 100% larger than the one of a lower diverter of the same reactor unit. The diameter of the ascender or riser is at least 1%, 10% or 100% larger than the one of the lower diverter of the same reactor unit. The descending and ascending tube parts are essentially vertical.

The ratio of the diameters $d_{n1}/d_{n2}$ is at least 1.01-400 or 4 to 40. The ratio of the diameters $d_{n1}/d_{n3}$ is 1-400 or 3 to 30. The ratio of the diameters $d_{n3}/d_{n2}$ is 1-400 or 3 to 30.

At least 2, 4, 6 or 8 reactor units are directly connected to each other in the embodiments.

Each of the reactor units consists of at least one diverter and a holding section.

The total length of all connected tube distances is at least 4, 16, 64 or 256 meters. The absolute total length of all tube distances is 4-64,000 or 250-4,000 meters.

The minimum length of linked tube sections, which cannot for example be separated completely or partially by blocking devices, is 1, 4, 16 or 64 meters. The number of the reactor units linked via tube sections which cannot be separated completely or partially, is 2-1000 or 11-100.

The length of the laminar stream reactor comprises the tube sections where the operating pressure is more than 5 bar.

In certain embodiments heat exchangers are positioned on the inlet and/or outlet side of the reactor, in which the temperature of the solid-fluid mixture is increased to >160° C. In these regions, the volume flow of the solid-fluid mixture can be divided to parallel partial flows.

Tubes, tube sections, tube parts or reactor units are connected to each other, if a continuous connection of the reaction chambers exists in the operating state, which enables a pressure equalization of the reaction spaces among each other. Such a connection exists with a laminar stream reactor at least over two reactor units or over a tube section of at least 4, 16, 64 or 256 meters.

Tube sections or tube parts are the elongated hollow spaces flown through by the reaction mixture independent of their form and geometry. Diverters are defined by a change of the average flow direction by at least 90 or up to 200 degrees. The cross section is conveniently or functionally shaped in a round manner, as the process is pressure-applied. Descenders or downer, ascenders or risers and diverters can also consist of several differently shaped tube parts or components.

The reaction spaces of at least two reactor units are connected in the operating state at pressures over 5 bar and are not separated by valves or other blocking or control devices.

The lower tube, tube section or tube part is the lower direction-changing tube part or the lower diverter with the diameter $d_{n,2}$. Tubes, tube pieces or tube parts are also called tube sections. The ascender or riser is the ascending tube, tube section or tube part with the diameter $d_{n,3}$. The upper tube or tube section is the upper direction-changing tube part or the upper diverter with the diameter $d_{n,4}$. The holding section is the downer, descending (descender) or ascending (ascender) tube, tube section or tube part with the diameter $d_{n,1}$.

Descenders or downers and/or ascenders or risers are holding sections. They have a larger volume than the diverters. The average flow direction of the solid-fluid mixture in the holding section is inclined to the horizontal. It is advantageous if the holding section is largely vertically positioned and build as a straight hollow container. The holding section is generally positioned in such a manner that the angle of the tube center axis to the horizontal plane is at least 2 or at least 60 degrees.

A diverter is arranged below a holding section. The lower diverter is a tube section which diverts the average flow direction of the solid-fluid mixture upwardly. Upper and lower diverters are designed in such a manner that the change of the amount angles of the tube axis is about 180 degrees, at least however 100 or 150 degrees.

The different tube elements are connected to each other by flange or weld connections. If tube elements with different diameters are connected, a reducing piece is additionally interconnected. A reducing piece or a reduction, which also comprises a reversed reducing piece, is a conical piece of a tube within a tube line and represents the changeover of two different nominal widths. Reducing pieces can consist of standard elements or metal components, including dished boilder ends, cage bases, cones, and can proceed concentrically or eccentrically. With concentric reductions, the wall of the reduction follows a straight circular cone, with eccentric reductions, the wall of the reduction follows a beveled circular cone and one of the casing lines proceeds parallel to the tube axis. Concentric reductions are more convenient with regard to a flow-technical view, while eccentric reductions can offer assembly advantages.

The average flow speed or flow velocity of the solid-fluid mixture in the lower diverter is at least 50% larger than in the holding section, which precedes it directly.

The diameters in particular of the descenders are conveniently chosen in such a manner that the maximum demixing velocity to be expected is smaller than the flow velocity. In the descenders, a lower speed results for the solid components depending on their tendency to float compared to the liquid phase, and a dwell period in the respective descender, which is inverse to the difference of the flow velocity and the demixing velocity. The dwell period of the solid components is thereby always (possibly even considerably) larger than the flow velocity of the liquid phase. A larger diameter of the descenders thus finally means that the dwell period of the solid components will be decidedly longer than the one of the liquid phase and reactor length is thus saved. It also means that an enrichment of the solid components results in the descenders, and, if the flow velocity sinks too low and reaches the vicinity of the demixing velocity, that the solid-fluid dispersion can develop as a fluid-in-solid mass. An upper limit for the descender diameters thus also has a desired technical effect.

According to a preferred embodiment, the length of a holding section is 2-12 meters. The total length of the descenders and ascenders is 320-1,920 meters. Further details can be taken from the following table.

| Reactor unit | $d_{n,1}$ (mm) | $d_{n,2}$ (mm) | $d_{n,3}$ (mm) | $d_{n,4}$ (mm) |
|---|---|---|---|---|
| 1-6 | 100 | 50 | 50 | 50 |
| 7-20 | 200 | 50 | 50 | 50 |
| 21-40 | 300 | 50 | 100 | 100 |
| 41-80 | 400 | 60 | 200 | 200 |
| 81-120 | 500 | 70 | 200 | 200 |
| 120-160 | 600 | 80 | 300 | 300 |

The diameters have the relations $d_{n,1} \geq d_{n,3}$ and $d_{n,1} > 1.25 d_{n,2}$ to each other. In particular, $d_{n,1} > d_{n,3} \geq d_{n,4} \geq d_{n,2}$ contains six individual relations between the diameters. $d_{n,1} > d_{n,3}$, $d_{n,1} > d_{n,4}$, $d_{n,1} > d_{n,2}$, $d_{n,3} \geq d_{n,4}$, $d_{n,3} \geq d_{n,2}$, $d_{n,4} \geq d_{n,2}$, which can be fulfilled independently of each other If not mentioned or described otherwise, the definitions and explanations in DE102008058444.4 are valid for the language use or wording, which is insofar included in the disclosure by incorporation.

The following parameters and physical magnitudes play a role for the design of the laminar stream reactor and the process control:
  "Variable material parameters" are meant to be parameters which change during the course of the reaction. Nearly all material variables of all phases (solid, liquid and gaseous) and in particular the one of the carbon-containing component, which ultimately defines the reaction product, change during the reaction, as for example the (dynamic) viscosity η (decreasing) and the density (increasing).
  "Variable process parameters" can be changed by a control as for example the volume flow rate or the flow velocity v.
  "Fixed process parameters" are given by the hardware, that is, the design and specification of the plant and can thus not be changed or not be changed easily within a plant, as for example the radius r or the (hydraulic) tube diameter d. The hydraulic tube diameter is defined here as 4*A/U with A: cross-sectional area and U: circumference. For a circular cross section, the hydraulic diameter is thus the same as the geometric diameter.

A reactor unit of a laminar stream reactor consists of at least 2 or 4 different tube diameters, wherein the diameters of a tube section with the running numeral n are $d_{n,1} > d_{n,3} \geq d_{n,4} \geq d_{n,2}$ (see above). The tube diameters increase incrementally in embodiments with increasing distance from the first reactor unit (ascending n).

The average flow speed or flow velocity can be determined with the help of flow meters or flow-through sensors. For example, the time which needs a defined volume from a color-marked fluid between entry and exit from the laminar stream reactor, can be used to determine the volume flow per time unit and thus also the flow velocities with the different given hydraulic diameters. The entry and exit of the colored fluid (a defined amount of water is e.g. dyed with potassium permanganate) from the laminar stream reactor can be determined optically by sight glasses. In a plant, the flow velocity is for example determined with a Coriolis mass flow meter (e.g. Promass 83S25 by Endress+Hauser).

The ratios of the average flow velocity or rate of flow velocities $v_{nm}$ of the solid-fluid mixture flowing or passing through tube sections m of a reactor or a tubular reactor unit n are $v_{n,2} > v_{n,1}$, $v_{n,2} \geq v_{n,3}$, $v_{n,2} \geq v_{n,4}$ or $v_{n,4} \geq v_{n,3}$. The average flow velocity in the lower diverter $v_{n,2}$ is 1-5,000, 10-500 or 30-200 m/min.

The average flow velocity of the solid-fluid mixture is 0.01-20, 0.05-10 or 0.1-3 m/min in a descending holding section. The average flow velocity is at least 50% larger in an ascending holding section compared to a descending holding section. In the lower diverter, the average flow velocity $v_{n,2}$ 1-1.000 times, 5-300 times or 20-100 times larger than in an abutting holding section. Both the upwardly-directed holding section as well as the downwardly-directed holding section can also be flown through in opposite direction. That means that depending on feedstock consistency both holding section can be exchanged.

The average flow velocity depends on the diameter, which increases incrementally with an increasing distance to the conveying means with the tubular reactor units according to the formula $v_{n=1} \geq v_{n=2}$ etc. The flow velocity in tube sections, which are not directed downwards, is increased at least by 10%, 20%, 50%, 100% or more. The flow velocity of the tube sections which are not directed downwards is at least increased by 1.1 times, 2, 5, 9, 20, 100 times or more.

The reaction starts when reaching the operating temperature of 100-250 or 140-180° C. The conversion reaction lasts, depending on the desired reaction product, between 40 and 720 or 90-180 minutes, in individual cases also up to 2160 minutes.

The time needed for the reaction mixture to pass through the laminar stream reactor is at least 40, 60, 90 or 120 minutes. The carbon content is for example increased within 120 minutes from 30% to 40% of the mass parts of the dry mass with brewer grains or spent grains as feedstock. The flow-through time or the time needed for the solid-fluid mixture to pass through all connected units or reactors is at least 40, 60, 90 or 120 minutes and altogether 90-180, 180-720 or 720-2,160 minutes.

With an increasing reaction time, that is, an increasing space (distance) to the first conveying means or the reactor inlet:
  the viscosity of the reaction mixture decreases
  the density differences decrease
  the demixing velocity of the solid-fluid mixture decreases.
  larger diameters can be chosen for the tube sections (increasing diameters).

For maintaining a laminar flow or for avoiding high turbulences which would be associated with increasing pressure of up to 3, 5 or 10 bar over the pressure difference which is normally present during regular operation, the viscosity is increased or the flow velocity is decreased by an increase of the diameters, withdrawal of water or supply of feedstock or intermediate products with a solid content higher than the one at the supply location.

The holding section is a tube section within the tubular reactor which follows the heat exchanger, thus a tube section in which the reaction mixture has reached the intended or reaction temperature.

The total volume of a laminar stream reactor is composed of the sum of the volumes of the individual reactor units n, wherein x is the number of the reactor units. The reactor units n consist of the tube sections m. The density of the solid phase increases by heating and the chemical course of the reaction and the viscosity of the solid-fluid mixture decreases. The particle size decreases simultaneously. The demixing velocity decreases thereby. A decreasing demixing velocity permits to increase the volumes of the tube sections during the course of the reaction in a corresponding incremental manner by means of the choice of larger diameters.

The total volume of a laminar stream reactor while neglecting the cross section transitions and curvatures or diverters is calculated as follows:

$$V = \pi \sum_{n=1}^{x} \sum_{m=1}^{4} l_{nm} \frac{d_{nm}^2}{4}$$

$l_{nm}$ lengths of tube sections with an average diameter $d_{nm}$, n running number of the tubular reactor unit, m running number of the tube section, x number of the reactor units.

The volume of a holding section is conveniently 0.1-100 or 0.5-10 m³. The total volume of a laminar stream reactor is conveniently 10-10,000 or 100 to 1,000 m³. The volume of a descender is larger than that one of a directly following ascender by 1%, 10% or 100% or also by the 1.1-40 or the 2-4 fold.

The average flow direction of the solid-fluid mixture within the holding section is in at least 5, 20% or 80% of the volume of a reactor unit or at least 1%, 5% or 50% of the total tube section inclined to the horizontal. It is advantageous if the average flow direction in the holding sections proceeds largely parallel to gravity. The angle amount of the flow direction of the largely vertically directed flow is at least 2 or at least 60 degrees to the horizontal.

The density increases during the conversion reaction by means of the chemical conversion over time by 5-60% or 20-40%. The flow resistance has to be kept low for maintaining the functionality of the laminar stream reactor. Turbulences lead to an increase of the flow resistance. The flow loss of turbulent flows is thus considerably larger and is a multiple of that one of a laminar flow. The critical Reynold number also increases by means of the increase of the viscosity, or the transition point, which characterizes the onset of a turbulence, is displaced towards higher flow velocities. The viscosity is influenced before, during and after the reaction by the ratio of fluid to solid components in the solid-fluid mixture
the mixing ratio of different feedstocks or starting substances
the withdrawal or supply of water or solid material
chemical or physical change as for example the density or particle size through chemical changes or comminution.

The viscosity decreases significantly by heating. In parallel, an additional decrease of the viscosity results during the course of the reaction by means of the chemical conversion.

The viscosity behaves reversely to the density, which following the heating process increases during the chemical conversion reaction. The viscosity thus decreases during the course of the reaction and the flow resistance decreases. However, the inclination of an almost laminar flow to turn into a turbulence one increases simultaneously. For a better use of the reactor space and for the stabilization of the flow mainly in the lower diverters, the viscosity is increased along the piping or a reactor section in some embodiments by the withdrawal of water and/or
the supply of solid material.

The supply of feedstocks with high solid contents larger than 25%, 50% or 75% and a particle size of up to 2, 4, or 6 mm in particular after the first heat exchanger sections or during the course of the process, e.g. in the center third of the reactor section, by means of a supply to following reactor units, increases the viscosity. It can also counteract overheating. A heat exchanger with tube diameters of 50 mm was e.g. flown through with corn silage with a solid content of 12-15% with 3-7 m³/hour. A pressure drop of about 2-4 bar was measured over a distance of about 120 meters. The low pressure drop implies an almost laminar flow. If water was passed through the tube distance at the same flow rate, the pressure increased severalfold (>15 bar). One can conclude from this that the transition point (transition Reynold's number) was exceeded and the almost laminar flow has changed to a turbulent flow.

During the reaction small particles are formed. The size of the small particles is 20-100 nanometers and increases over time. For increasing the efficiency of the reactor space particles of small sizes that have already been formed into hydrochar or HTC reaction products can be conveniently handled are discharged. The discharge takes place during the last half, third, fourth or fifth part of the reactor or reaction. The particle sizes to be discharged range from 0.5-1 or 0.5-2 mm. These particles are discharged in a suspension containing solid particles with a longest diameter of up to 2 mm from the solid-fluid mixture prior to the termination of the treatment.

The object is solved according to the invention in that a device is used for the solid-fluid separation with holes or pores spaced from each other with a diameter of at least 0.5 mm for discharging a suspension containing solid particles with a longest diameter of 2 mm of a solid-fluid mixture of water and a carbon-containing component.

DESCRIPTION OF THE FIGURES

FIG. 3 shows a schematic depiction of the heat exchanger units and the transition to the tube reactor units as well as strands I and II combining dry and wet biomass.

FIG. 1 shows a schematic depiction of a tube reactor unit n tube sections m (1-4) with the diameters $d_{nm}$ of a stream, reactor in an exemplary manner. The solid-fluid enters the tube section 1 with the diameter $d_{n,1}$ via a reversed reducing piece. As the diameter of the tube section 1 increases compared to the previous tube section, the flow velocity $v_{n,1}$ in the tube section 1 slows down (indicated by the single arrow). The solid-fluid mixture exits the tube section 1 with the diameter $d_{n,1}$ via a reducing piece 5 into the tube section 2 with the diameter $d_{n,2}$. The solid-fluid mixture from the tube section 2 with the diameter $d_{n,2}$ enters the tube section 3 with the diameter $d_{n,3}$ via a further, reversed reducing piece 6. The solid-fluid mixture exits the tube section 3 with the diameter $d_{n,3}$ via a further reducing piece onto the tube section 4 with the diameter $d_{n,4}$. The solid-fluid mixture flows from the tube section 4 into the following reactor unit n+l (without depiction) via reversed reducing piece 7 and reducing piece 8. This sequence is repeated periodically. The flow velocity and lengths of the tube pieces (measured along their respective center line) are indicated with $v_{nm}$ or $l_{nm}$. Additionally, two (tube section m=3) to four (tube section m=2) arrows are correspondingly shown for demonstration.

FIG. 2 shows a schematic depiction of a plant for the continuous production of materials or fuels of a solid-fluid mixture of water and a carbon-containing component in an exemplary manner, wherein the solid-fluid mixture is treated at a temperature of over 100° C. and a pressure of over 5 bar. The plant comprises a double-strand feeding device, which consists of the conveying strands I and II. The strand I serves for conveying "dry" biomass of feedstock that cannot be pumped or can only be pumped with difficulty, for example with a high solid content of 15 to 99 weight %. For this, the "dry" biomass is stored in a silo 11 and brought to a container 12 therefrom, preferably a sliding floor container. The feedstocks are brought into a comminution device 13 via a conveying device, which can for example be a screw conveyor or a conveyor belt. The comminution device is for example designed as a wet or dry mill or as another suitable mechanical comminution device. From there the treated feedstock is conveyed into a mixing vessel 16. In the mixing container 16, the dry biomass is mixed with water which can contain process water or concentrated process water from the reservoir 14 and a catalyst or a catalyst mixture from at least one container or dosing device 15 by means of an agitating device. The mixture is supplied to the incubation vessel 18 via the conveying device 17. The incubation vessel 18 enables a residence time of the catalyst on the material at a lower pressure. The containers 16 and 18 are designed with a double wall and have a heating water connection to enable a preheating of the material to about for example 20-99 or 50-70° C. The incubated material of the "dry" feedstock or starting materials is brought from the first conveyor strand I into a reactor unit n as for example 29, 30, 31, 32 or 33, 34 under pressure above the vapor pressure of the reaction mixture by means of the conveyor devices 19 and 20, which are for example designed as screw or bucket chain conveyors.

Figure 1:
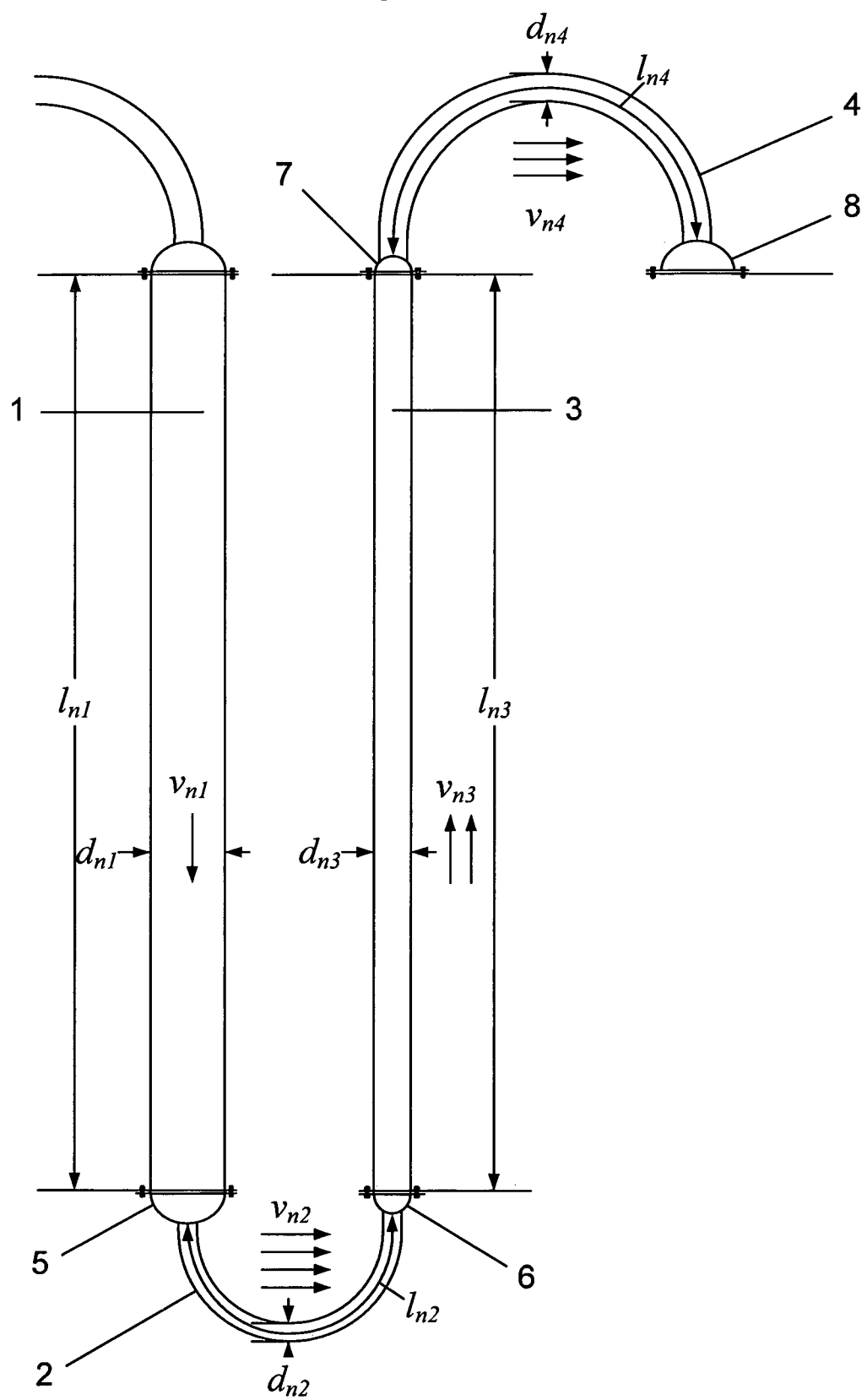
FIG. 1 shows a schematic depiction of a tube reactor unit n with the tube sections m in an exemplary manner.

Via the conveying strand II, "wet" biomass consisting of feedstocks that can be pumped or biomass pulp, which can also consist of mixtures of biomass or feedstock, for example with a solid content of 1 to 50 weight % is conveyed from a storage vessel 22 to a mixing device 24 by means of a conveying device 23 and is mixed in the mixing unit 24 with water or process water from the reservoir 14 and catalyst of at least one container or dosing device 25, is incubated in an incubation container 26, and is supplied to the reactor 29-38 by means of a suitable conveying device 27, which can for example be designed as a piston, displacement or eccentric screw pump. The material is heated to at least 160-180, 200-220, or 220-250° C. by means of at least one heat exchanger unit 28 and, for example, also shown as heat exchanger unit 39 in FIG. 2. The "wet" feedstocks or starting materials from the conveying strand II preheated in such a manner are combined with the "dry" starting materials from the conveying strand I by means of the described or other suitable conveying devices. The point of the introduction of "dry" starting materials can be varied and can take place in a reactor or tubular reactor unit n as for example in 29, 30, 31, 32 or 33, 34, but also in 35, 36 or 37, 38 etc. "Dry" starting materials or feedstocks, in particular those with a largest particle diameter of below 6 mm, below 4 mm, or below 2 mm, and a dry substance content of over 30%, over 40%, or over 50% are conveniently supplied in the center third of the piping or reactor distance. The supply can for example take place in the region of an upper diverter 4 or at the changeover 8 between it and the following descender 1. The "wet" starting substances were introduced or provided previously under pressure above the vapor pressure of the reaction mixture. The ratio of the mass flow rate from the conveying strand I to the conveying strand II or from the provided to the added starting substances is for example 1:20, 1:5, 1:1 or 10:1. Within the (largely) laminar flow of the laminar stream reactor, an even mixing of the reaction mixture takes place via the different reactor units. The heating and the discharge of exothermic generation takes place by means of tempering devices as for example a heat exchanger device and/or a double wall of the reactor or a reactor unit. Tempering devices can for example be formed as spiral, tubular, batch or spiral heat exchangers. The necessary flow-through or dwell period is achieved by the sequential connection of reactor units. In order to enable a longer dwell period, the reaction mixture in individual reactor units is kept moving by means of a circulation pump. Caking or blockages are thereby avoided. Conveying means for the acceleration of fluids including fluid jet mixers or nozzles can additionally be used.

By the withdrawal of process water, smaller reactor volumes or smaller reaction spaces are needed during the further course of the process. The pressure relaxation 40 after the completed flow-through is controlled by a rearwardly-directed relaxation pump, which is formed for example as an eccentric screw pump, spiral displacement pump or piston membrane pump. The reaction mixture is cooled and buffered further in a buffer or relaxation vessel 41 and reaches from there or also directly from the relaxation pump to the dewatering and/or drying 42. The reaction product is intermediately stored in a storage container or silo 43 as slurry or dried bulk material, before it is transported 44 or supplied to another process.

FIG. 3 shows a schematic depiction of the heat exchanger units and the transition to the tube reactor units as well as strands I and II combining dry and wet biomass. The "dry" feedstock is brought from the first conveyor strand I by means of the conveyor devices 19 and 20 into the heat exchanger 28 consisting of several heat exchanger units 50, 51, 52 and 53 and/or into reactor units as for example 29, 31 or 33, 34 under pressure above the vapor pressure of the reaction mixture. The "dry" feedstock is preheated before entering the introduction device 91-97 to 20-40, 40-70 or 70-99° C. Following the device the feedstock is further heated to 100-130, 130-170 or 170-200° C. by heat exchanger 101, 102, 103, 104, 105, 106 and/or 107. The introduction device 91-97 consists of a shuttle valve, rotary lock or swivel flap, a forced conveyor, which is for example an injector, a double screw extruder, an eccentric spiral pump, a piston pump, a spiral displacement pump, which are respectively equipped with or without compactor screws, or a double screw compactor. The introduction device can additionally be provided with a locking device or valve. The introduction device ensures that the incubated material from the strand I with a pressure level above the internal reactor pressure is introduced into the respective reactor unit and prevents backlashes into the supply device. The swivel flap feeder is for example filled in a controlled manner by a rotary feeder.

Via the conveying strand II, "wet" biomass consisting of feedstocks that can be pumped or biomass pulp, which can also consist of mixtures of biomass or feedstock, for example with a solid content of 1 to 50 weight %. The "wet" biomass is conveyed and brought to increasing levels of pressure in increments using conveying devices 27, 45, 46 and/or 47. The conveying devices can for example be designed as a piston, displacement or eccentric screw pump. In a first increment the pressure can be brought up to 2-20, 4-16 or 8-14 bar, in a following increment following another conveying device 45 the pressure is further increased to an additional 2-4 or up to 6, 8, 12 or 20 bar. Each subsequent conveying device increases the pressure in a similar fashion.

Figure 2:
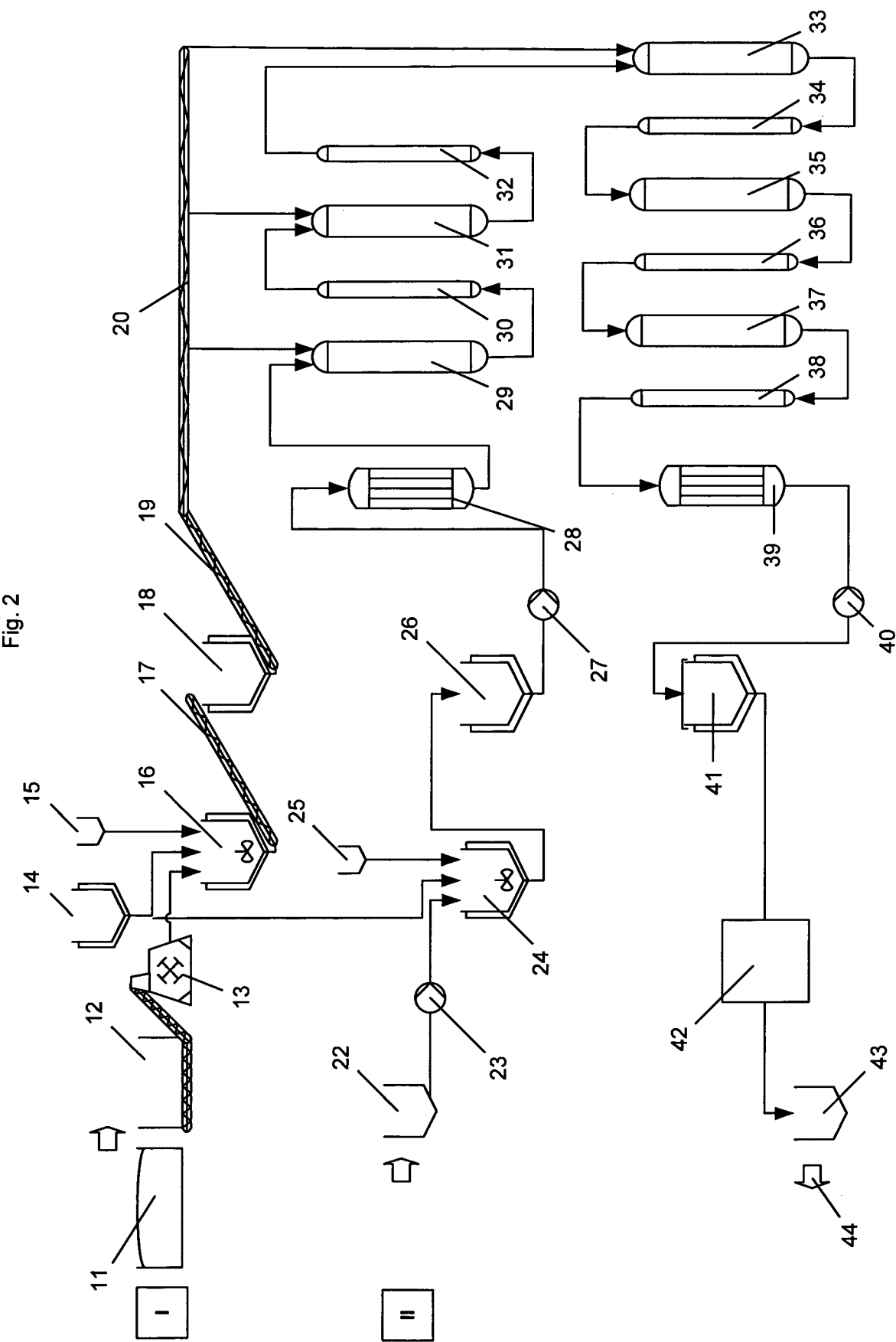
FIG. 2 shows a schematic depiction of a plant for the continuous production of materials or fuels of a solid-fluid mixture in an exemplary manner.

In between those conveying devices solid-fluid separation devices 60, 61, 62, 63, 64, 65 and/or 66 are positioned. The solid-fluid separation devices can for example be filters. More solid-fluid separation devices such as, for example, 68, 69, 70, 71, 72, 73 and/or 74 as shown in FIG. 3, are positioned throughout the length of the heat exchanger and reactor units. Comminution devices 81, 82, 83 and 84 which are for example wet mills or baffles are positioned following a introduction device 61, 46 and/or 47 or before or behind comminution devices or before heat exchanger units or a reactor unit as for example 31. Following reactor unit 33 the solid-fluid mixture is guided through the following reactor units 34-38 as depicted in FIG. 2.

The invention claimed is:

1. A device for treating a solid-fluid mixture of water and a carbon-containing component at a temperature of 100-300° C. and a pressure of 5-70 bar, said device comprising:
    a reactor system charged with said pressure with at least one reactor unit consisting of a lower diverter tube section operably connects between at least two different tube sections comprising a downwardly-directed flow tube section and an upwardly-directed flow tube section, a pump positioned upstream of said at least one reactor unit, and a counter pressure pump positioned downstream of each of said at least one reactor unit to maintain said pressure in an interior of each of said at least one reactor unit, said reactor system being configured to increase a dwell period of the solid components compared to a liquid phase in said downwardly-directed flow tube section, said dwell period is proportional to an inverse of a difference between an average flow velocity vni and a maximum demixing velocity, whereby said maximum demixing velocity is less than said average flow velocity $v_{n1}$, wherein
    a. said lower diverter tube section moving an average flow velocity $v_{n2}$ of the solid-fluid mixture in a range of about 1.5-1,000, 5-300 or 20-100 m/min larger than in an average flow velocity $v_{n1}$ of said downwardly-directed flow tube section that precedes it directly, wherein said downwardly-directed flow tube section and said upwardly-directed flow tube section of said at least one reactor unit have a tube center axis inclined to a horizontal plane; and
    b. a diameter of said downwardly-directed flow tube section is at least 50% larger than a diameter of said lower diverter tube.

2. A device for treating a solid-fluid mixture of water and a carbon-containing component at a temperature of 100-300° C. and a pressure of 5-70 bar, said device comprising:
    a reactor system charged with said pressure with at least two reactor units, said at least two reactor units comprising a first reactor unit operably connected to a second reactor unit, each of said at least two reactor units consisting of at least three different tube sections comprising a downwardly-directed flow tube section, a lower diverter tube section, and an upwardly-directed flow tube section, a counter pressure pump positioned downstream of each of said at least two reactor units to maintain said pressure in an interior of each of said at least two reactor units, and
    a plurality of feeding devices for starting materials with a solid content in a range of about 1-50 weight percentage (%) or 15-99 weight percentage (%) respectively different to each other assigned to each of said at least two reactor units, wherein
    a. said lower diverter tube section is configured to move an average flow velocity $v_{n2}$ at a rate in a range of about 1.5-1000 m/min larger than an average flow velocity $v_{ni}$ of said downwardly-directed flow tube section that precedes it directly of said solid-fluid mixture upwards into said upwardly-directed flow tube section, said lower diverter tube section is operably connected directly to said downwardly-directed flow tube section and said upwardly-directed flow tube section, wherein said downwardly-directed flow tube section and said upwardly-directed flow tube section of said at least one reactor unit are inclined to the horizontal and/or are vertical;
    b. an upper diverter tube section configured to move an average flow velocity $v_{n4}$ therein, said average flow velocity $v_{n2}$ in said lower diverter tube section wherein said velocity $v_{n2}$ is about 1.1-2, 2-5 or 4-40 times greater than said average flow velocity $v_{n4}$ in said upper diverter tube section; and/or
    an average flow velocity $v_{n3}$ in said upwardly-directed flow tube section that follows directly said average flow velocity $v_{n2}$ is in a ratio of about 1.1-40 or 2-5 times greater than said average flow velocity $v_{n1}$ in said downwardly-directed flow tube section directly preceding said lower diverter tube section.

3. The device according to claim 2, wherein solid fluid mixture from said upwardly-directed flow tube section flows upward into said upper diverter tube section, said upper diverter tube section is configured to move the sold-fluid mixture flow to a second downwardly-directed flow tube section, said solid-fluid mixture in said upper diverter tube section has an average flow velocity $v_{n4}$ and in said upwardly-directed flow tube section has an average flow velocity $v_{n3}$.

4. The device according to claim 3, comprising said at least two reactor units being arranged in series.

5. The device according to claim 4, wherein said first reactor unit in the arranged series of said at least two reactor units comprises a hydraulic diameter $d_{n2}$ of said lower diverter tube section, and a diameter $d_{n4}$ of said upper diverter tube section.

6. The device according to claim 5, wherein a hydraulic diameter $d_{n1}$ of said downwardly-directed flow tube section and/or a hydraulic diameter $d_{n3}$ of said upwardly-directed flow tube section for a following said second reactor unit is larger than said hydraulic diameter $d_{n1}$ of said downwardly-directed flow tube section and/or said hydraulic diameter $d_{n3}$ of said upwardly-directed flow tube section of the preceding said first reactor unit.

7. The device according to claim 6, wherein at least one heat exchanger is arranged on an inlet side and/or on an outlet side of one or more of said at least two reactor units.

8. The device according to claim 7, wherein a ratio of a length of said downwardly-directed flow tube section and/or said upwardly-directed flow tube section to the one of said lower diverter tube section and/or said upper diverter tube section is at least 10:1.

9. The device according to claim 7, wherein the ratio of said length of said downwardly-directed flow tube section and/or said upwardly-directed flow tube section to its hydraulic diameter is 2:1 to 800:1, 5:1 to 400:1 or 10:1 to 160:1.

10. A device for treating a solid-fluid mixture of water and a carbon-containing component at a temperature of 100-300° C., and a pressure of 5-70 bar, said device comprising:
   a reactor system charged with said pressure with one one or more reactor units, a first reactor unit of said one or more reactor units comprises at least two different tube sections consisting of a downwardly-directed flow tube section with a diameter $d_{n1}$ and an upwardly-directed flow tube section with a diameter $d_{n3}$, a counter pressure pump positioned downstream of said first reactor unit in order to maintain said pressure in an interior of said first reactor unit, wherein
   a. a lower diverter tube section operably connecting said downwardly-directed flow tube section to said upwardly-directed tube section, said lower diverter tube diverts a flow of the solid-liquid mixture at an average flow velocity $v_{n2}$ in a range of about 10-500 or 30-200 m/min, wherein said downwardly-directed flow tube section and said upwardly-directed flow tube section have a tube center axis inclined to the horizontal or from the vertical; and
   b. a cross section of said downwardly-directed flow tube section is dimensioned at least 50% larger than said lower diverter tube section directly connected thereto, and a cross section of a second downwardly-directed flow tube section of a following second reactor unit of said one or more reactor units configured in a range of at least 10% larger than a corresponding downwardly-directed flow tube section of a preceding reactor unit such as said first reactor unit of said one or more reactor units characterized by said average flow velocity $v_{n2}$ being configured to be greater than said maximum demixing velocity of said lower diverter tube section in a ratio of said average flow velocity $v_{n2}$ to an average flow velocity $v_{n1}$ of about 1.1-2, 2-5 or 4-40 times.

11. The device according to claim 10, further comprising an upper diverter tube section operably connected to said upwardly-directed flow tube section configured to receive flows of the solid-fluid mixture moving upwardly into said upper diverter tube section and to move the solid-fluid mixture flows to said second downwardly-directed flow tube section.

12. The device according to claim 11, wherein hydraulic diameters of said downwardly-directed flow tube section, said lower diverter tube section, said upwardly-directed flow tube section, and said upper diverter tube section moves said sold-fluid mixture flow through in a directly consecutive manner so as to fulfill of one or more of $d_{n1} > d_{n3} \geq d_{n4} \geq d_{n2}$, wherein n is a running number of said reactor unit, and an indices number gives the running number of said downwardly-directed flow tube section, upwardly-directed flow tube section, said upper diverter tube section, and said lower diverter tube section.

13. The device according to claim 12, comprising several of said one or more reactor units arranged in series.

14. The device according to claim 13, wherein said one or more reactor units are arranged in series comprising said first reactor unit and said second reactor unit, wherein said second reactor unit is configured with said second downwardly-directed flow tube section having a diameter $d_{n3}$ that is larger than said diameter $d_{n1}$ of a preceding downwardly-directed flow tube section of said first reactor unit.

15. The device according to claim 14, wherein at least one heat exchanger is arranged on an inlet side of said one or more reactor units and/or said at least one heat exchanger is arranged on an outlet side of said reactor units.

16. The device according to claim 10, wherein a ratio of a length $I_1$ of said downwardly-directed flow tube section and/or a length $I_3$ of said upwardly-directed flow tube section to a length $I_2$ of said lower diverter tube section and/or a length $I_4$ of said upper diverter tube section, respectively, is at least 10:1.

17. The device according to claim 10, wherein a ratio of said length $I_1$ of said downwardly-directed flow tube section and/or a length $I_3$ of said upwardly-directed flow tube section to said diameter $d_{n1}$ of said lower diverter tube section and/or a diameter $d_{n4}$ of said upper diverter tube section, respectively, is about 2:1 to 800:1, 5:1 to 400:1 or 10:1 to 160:1.

18. A device for treating a solid-fluid mixture of water and a carbon-containing component at a temperature of 100-300° C. and a pressure of 5-70 bar, said device comprising:
   at least two reactor units, said at least two reactor units being arranged as a first reactor unit operably connected to a second reactor unit, each of said first and second reactor units consisting of at least three different tube sections comprising a downwardly-directed flow tube section for downwardly-directed flow of the solid-fluid mixture, an upwardly-directed flow tube section for upwardly-directed flow of the solid-fluid mixture, and a lower diverter tube section operably connected between said downwardly-directed flow tube section and said upwardly-directed flow tube section, and a device connected to a last half, third, fourth or fifth part of said second reactor configured to discharge a suspension containing solid particles with a diameter of up to 2 mm, said lower diverter tube section diverting an average flow velocity $v_{n2}$ of the solid-fluid mixture, said average flow velocity $v_{n2}$ of the solid-fluid mixture in said lower diverter tube section is 1 to 1000 times greater than in said downwardly-directed flow tube section abutting said lower diverter tube section, said lower diverter tube section diverting said solid-fluid mixture upwards into said upwardly-directed flow tube section, said lower diverter tube section is operably connected directly to said downwardly-directed flow tube section and said upwardly-directed flow tube section, wherein said downwardly-directed flow tube section and said upwardly-directed flow tube section have a tube center axis inclined to a horizontal plane thereof or from vertical.

* * * * *